(12) United States Patent
Poulsen et al.

(10) Patent No.: US 8,958,573 B2
(45) Date of Patent: Feb. 17, 2015

(54) APPARATUS, SYSTEMS AND METHODS FOR CONTROLLING AN ELECTRONIC DEVICE USING AN ACCESSORY

(75) Inventors: Jens Kristian Poulsen, Kitchener (CA); John Douglas McGinn, Cambridge (CA)

(73) Assignee: BlackBerry Limited, Waterloo, Ontario (CA)

( * ) Notice: Subject to any disclaimer, the term of this patent is extended or adjusted under 35 U.S.C. 154(b) by 582 days.

(21) Appl. No.: 13/309,099

(22) Filed: Dec. 1, 2011

(65) Prior Publication Data

US 2012/0140957 A1 Jun. 7, 2012

Related U.S. Application Data (60) Provisional application No. 61/418,787, filed on Dec. 1, 2010.

(51) Int. Cl.
  *H04R 3/00* (2006.01)
  *H04M 1/60* (2006.01)
  *H04M 1/725* (2006.01)

(52) U.S. Cl.
  CPC ........ *H04M 1/6058* (2013.01); *H04M 1/72527* (2013.01)
  USPC ............................ 381/111; 381/56; 455/556.1

(58) Field of Classification Search
  USPC .................. 381/74, 110, 111, 112, 57–58, 61, 381/91–92, 98, 317; 455/569.1, 575.1, 455/556.1, 575.2, 418, 419, 41.2
  See application file for complete search history.

(56) References Cited

U.S. PATENT DOCUMENTS

| | | | | |
|---|---|---|---|---|
| 4,042,789 A | * | 8/1977 | Richards | 340/13.34 |
| 6,111,960 A | * | 8/2000 | Aarts et al. | 381/61 |
| 6,745,014 B1 | | 6/2004 | Seibert et al. | |
| RE38,822 E | * | 10/2005 | Aarts et al. | 381/61 |
| 7,110,799 B1 | | 9/2006 | Willins et al. | |
| 7,627,128 B2 | | 12/2009 | Sander et al. | |
| 2009/0179768 A1 | | 7/2009 | Sander et al. | |
| 2009/0220114 A1 | * | 9/2009 | Wilson | 381/317 |

OTHER PUBLICATIONS

European Patent Office, Extended European Search Report for European Patent Application Serial No. 11191626.8, mailed Mar. 26, 2012.
Response to Extended European Search Report, European Patent Office, European Patent Application Serial No. 11191626.8, dated Dec. 6, 2012.
Canadian Patent Office, Examiner Report for Canadian Patent Application No. 2,760,220, mailed Apr. 12, 2013.
Response to Canadian Patent Office Examiner Report, Canadian Patent Application No. 2,760,220, dated Oct. 11, 2013.

* cited by examiner

*Primary Examiner* — Vivian Chin
*Assistant Examiner* — Friedrich W Fahnert
(74) *Attorney, Agent, or Firm* — Bereskin & Parr LLP (57) ABSTRACT

A system for controlling an electronic device, including an accessory coupled to the device having a control interface for receiving at least one input and a tone generator, the accessory configured to, in response to an input, generate a corresponding control tone using the tone generator, and send the control tone and a calibration sequence to the device. The device is operable to receive the calibration sequence and control tone. The device includes a zero-crossing detector operable to determine at least one of the start or ending of each of the calibration sequence and the control tone and having a circuit operable to determine the periods of the calibration sequence and the control tone based on the zero-crossing detector output.

29 Claims, 9 Drawing Sheets

FIG. 9

APPARATUS, SYSTEMS AND METHODS FOR CONTROLLING AN ELECTRONIC DEVICE USING AN ACCESSORY

RELATED APPLICATIONS

This application claims the benefit of U.S. provisional application Ser. No. 61/418,787 filed Dec. 1, 2010 and entitled APPARATUS, SYSTEMS AND METHODS FOR CONTROLLING AN ELECTRONIC DEVICE USING AN ACCESSORY, the entire contents of which are hereby incorporated by reference herein for all purposes.

FIELD

Embodiments herein relate to electronic devices and in particular to apparatus, systems and methods for controlling one or more aspects of an electronic device using an accessory, such as a headset.

INTRODUCTION

Electronic devices, including portable electronic devices like smart phones, have gained widespread use and may provide a variety of functions including telephonic services, text messaging and other data applications, playing media such as music and movies, and other functions.

Electronic devices are often used with accessories such as headsets. For example, some electronic devices have audio jacks that are sized and shaped to receive a mating plug from a headset. A user connects the headset to the electronic device by inserting the plug on the headset into the audio jack on the electronic device. Once connected, audio can be output to the user via speakers on the headset accessory.

In some electronic devices, headsets may incorporate a microphone to allow audio signals (e.g. speech) to be sent from the accessory to the electronic device. This may allow the user to make phone calls through the accessory, record voice memos, and so on.

In some cases, a user may wish to control some aspects of the electronic device via the accessory. Accordingly, some accessories include a button and when the button is pressed, the microphone line on the accessory may be shorted to ground. Circuitry in the electronic device can monitor and interpret this grounding as a signal that the button has been pressed, and then take the corresponding action (e.g. answer an incoming telephone call, skip the currently playing song, and so on).

DRAWINGS

For a better understanding of the embodiments described herein, and to show how they may be carried into effect, reference will now be made, by way of example, to the accompanying drawings.

DESCRIPTION OF VARIOUS EMBODIMENTS

Generally, some embodiments as described herein may be implemented on one or more electronic devices, which may include a wide range of devices, such as mobile phones, smart phones, personal digital assistants (PDAs), personal or desktop computers, notebooks, laptops, digital audio/video players, digital audio/video recorders, tablet computers, and so on.

On some of these electronic devices, particular computer resources (e.g. memory capacity, processing power and screen space) may be more limited than on other devices. A portable smart phone, for example, may have a smaller display and less memory capacity than a personal computer, which may have a larger display and more memory. However, the concepts as described herein are not limited to any particular kind of electronic device, but are generally suitable for use on various electronic devices with various computer resources.

In some embodiments, the electronic device may be a portable electronic device, such as a smart phone or personal digital assistant (PDA), and which may have voice communication capabilities, data communication capabilities, or both, over one or more wired connections or a wireless connection, for example.

Some embodiments may be directed to a system for controlling an electronic device, the system comprising an accessory coupled to the electronic device, the accessory having a user control interface for receiving at least one input, and a tone generator, the accessory configured to, in response to an input, generate a corresponding control tone using the tone generator, and send the control tone and a calibration sequence to the electronic device, the electronic device operable to receive the calibration sequence and control tone, and including a zero-crossing detector operable to determine at least one of the start or ending of each of the calibration sequence and the control tone and having a circuit operable to determine the periods of the calibration sequence and the control tone based on the zero-crossing detector output, the electronic device further operable to compensate for errors in the control tone based on the periods of the calibration sequence and the control tone to determine the input, and then execute an appropriate action based on the input.

In some embodiments, the period of the control tone may be selected so as to be substantially inaudible to a human user. The period of the calibration sequence may be selected so as to be substantially inaudible to a human user.

In some embodiments, the electronic device compensates for errors in the control tone by taking the ratio of the measured periods of the calibration sequence and the control tone to determine the input.

In some embodiments, the electronic device includes a pre-amplifier, and the zero-crossing detector is positioned after the pre-amplifier.

In some embodiments, the electronic device includes a microphone pre-amplifier, and the zero-crossing detector is positioned after the microphone pre-amplifier. The electronic device may include a high-pass filter and the calibration sequence and control tone may be passed through the high-pass filter to avoid large DC-signals being sent to the microphone pre-amplifier. The output from the microphone pre-amplifier may be passed to a first-order or higher-order high-pass filter to attenuate signals in the audio band.

In some embodiments, the zero-crossing detector includes a hysteresis in order to decrease the influence of at least one of electric noise or acoustic noise. The output from the zero-crossing detector may be fed to a period measuring circuit controlled by an external clock signal. The output from the period measurement circuit may be filtered, so that only periods within a certain time window are accepted to decrease any false detection. The output may be averaged over a number of zero-crossings in order to decrease the influence of any noise. The averaged output may be measured twice and first accepted when two averaged measurement differ less than a certain time window to decrease the influence of transient conditions. The averaged output may be compared to the last accepted value, and when the difference of a new measured value is outside a certain time window as compared to the last accepted value, the new measured value will be accepted as a new value. The output from the period measurement circuit may be fed to a buffer so that multiple button presses may be read even if there is some latency between receiving multiple tones and the system reading the values of these measurements.

In some embodiments, the system further comprises a division circuit implemented in at least one of hardware or software, the division circuit based on the measured period values in order to automatically correct for the ratio between two measured periods.

In some embodiments, the system is configured for biasing an external device (e.g. an accessory) with two voltage levels, a first voltage level to wake up and activate the external device and a second lower voltage level that will not activate the device but which is used to detect the absence or presence of the external device.

In some embodiments, the system is configured for biasing an external device with a sufficiently high bias voltage and detecting the presence of the external device by detecting a valid period value immediately after powering on the device.

According to another aspect, a method for controlling an electronic device, the method comprising receiving an input, in response to receiving the input, generating a corresponding control tone using a tone generator, sending the control tone and a calibration sequence to the electronic device, receiving the calibration sequence and control tone at the electronic device, determining periods of the calibration sequence and the control tone, compensating for errors in the control tone based on the periods of the calibration sequence and the control tone to determine the input, and executing an appropriate action based on the input.

In some embodiments, the period of the control tone is selected so as to be substantially inaudible to a human user.

In some embodiments, the period of the calibration sequence is selected so as to be substantially inaudible to a human user.

In some embodiments, the compensating for errors in the control tone includes taking the ratio of the periods of the calibration sequence and the control tone to determine the input.

In some embodiments, the determining of the periods of the calibration sequence and the control tone is done using a zero-crossing detector In some embodiments, the method further comprises filtering the calibration sequence and control tone with a high-pass filter to remove large DC-signals.

In some embodiments, the method further comprises filtering the calibration sequence and control tone to attenuate signals in the audio band.

In some embodiments, the calibration sequence is sent before the control tone.

In some embodiments, the calibration sequence is sent after the control tone.

According to another aspect, a system for controlling an electronic device, the system comprising an accessory coupled to the electronic device, the accessory having a user control interface for receiving at least one input and a tone generator, and the accessory configured to, in response to an input, generate a corresponding control tone using the tone generator and send the control tone and a calibration sequence to the electronic device, the electronic device operable to receive the calibration sequence and control tone, and including a zero-crossing detector operable to determine the periods of the calibration sequence and the frequency of the control tone, the electronic device further operable to compensate for errors in the control tone based on the periods of the calibration sequence and frequency of the control tone to determine the input, and then execute an appropriate action based on the input.

According to another aspect, a system for controlling an electronic device, the system comprising an accessory coupled to the electronic device, the accessory having a user control interface for receiving at least one input and a tone generator, the accessory configured to, in response to an input, generate a corresponding control tone using the tone generator, and send the control tone and a calibration sequence to the electronic device, the electronic device operable to receive the calibration sequence and control tone, and including a zero-crossing detector operable to determine the frequency of the calibration sequence and the period of the control tone, the electronic device further operable to compensate for errors in the control tone based on the frequency of the calibration sequence and the period of the control tone to determine the input, and then execute an appropriate action based on the input.

Figure 1:
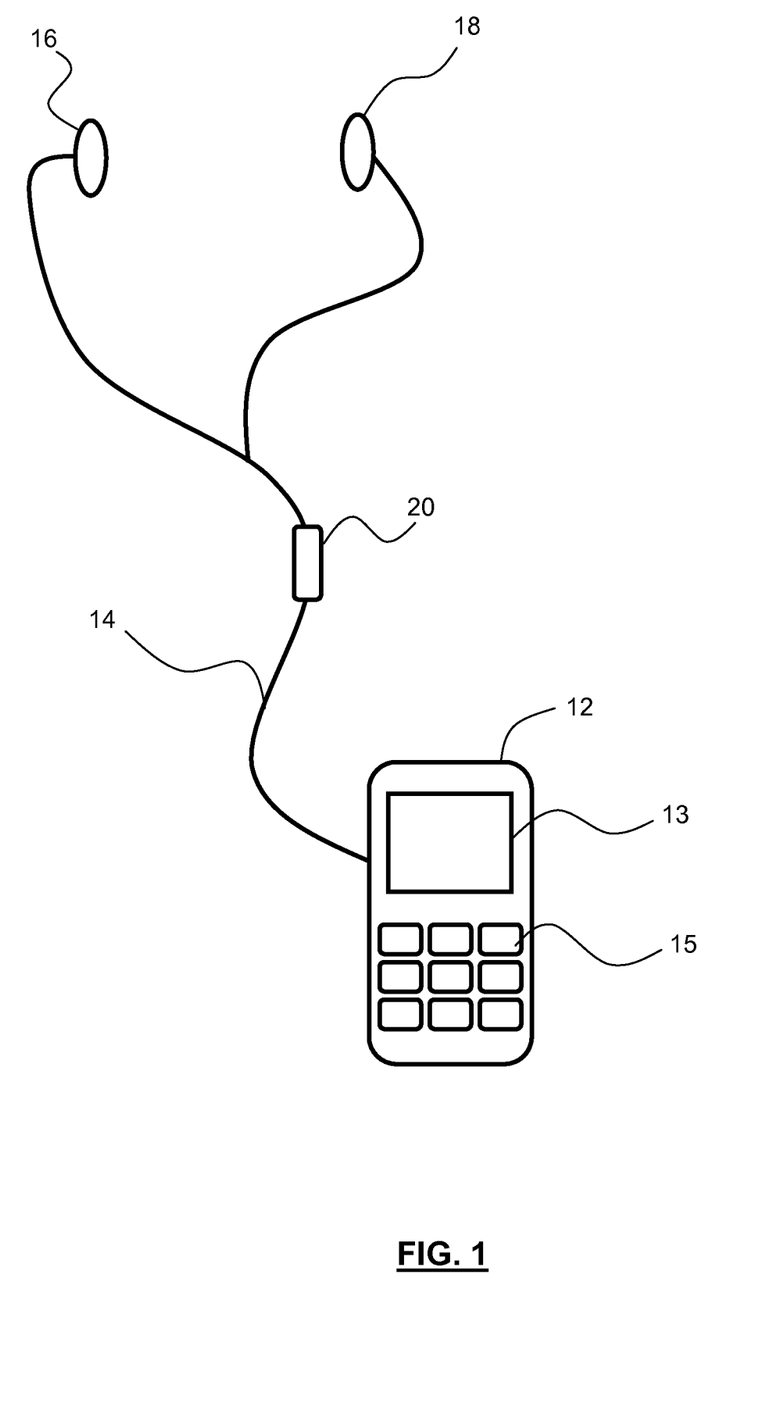
FIG. 1 is a schematic representation of an electronic device and an accessory operable for controlling one or more aspects of the electronic device according to one embodiment.

Reference is now made to FIG. 1, which is a schematic diagram illustrating an electronic device 12 and an accessory 14 operable for controlling one or more aspects of the electronic device 12 according to some embodiments. As shown, the accessory 14 is a headset having one or more speakers (e.g. speakers 16, 18 and a user control interface 20 for receiving one or more user inputs for controlling aspects of the electronic device 12 (although in other embodiments other accessories may be used). The speakers 16, 18 of the headset accessory 14 are generally operable to output audio content, such as music, speech, and so on.

The electronic device 12 may comprise any suitable electronic device, such as a smart phone having a display 13 and keyboard 15 (as shown), a tablet computer, a media device, and so on.

Figure 2:
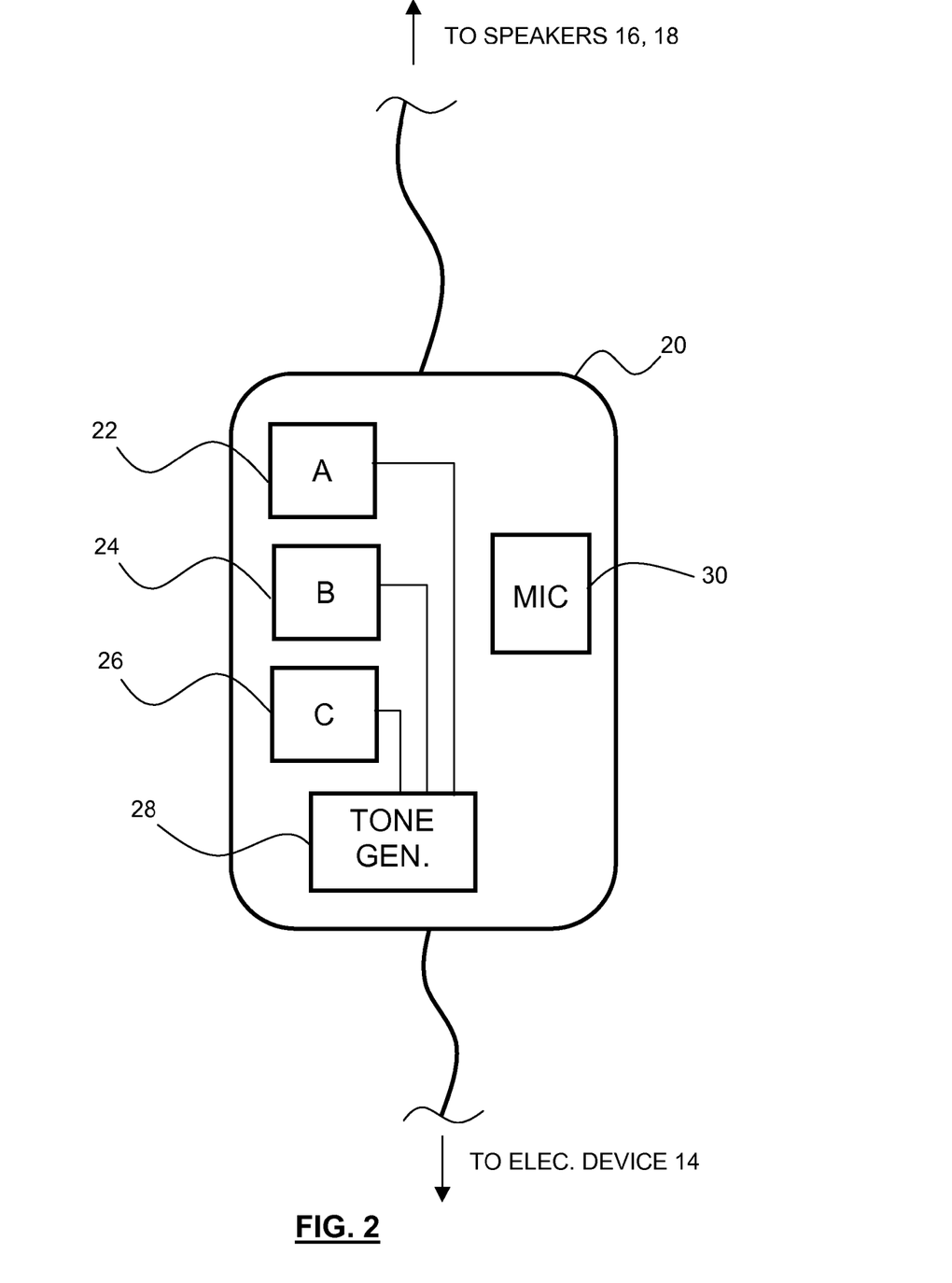
FIG. 2 is a schematic representation of a user control interface for the accessory of FIG. 1.

As shown in FIG. 2, the user control interface 20 may include one or more buttons, such as a first button 22, a second button 24 and a third button 26. When a user provides one or more inputs to the accessory 14 using the user control interface 20 (e.g. by pressing one or more of the buttons 22, 24, 26), a signal will be sent to the electronic device 12 to direct the electronic device 12 to take an appropriate action (e.g. increase or decrease volume of audio being output by the speakers 16, 18, answer an incoming telephone call, etc.).

Providing the user control interface 20 on the accessory 14 may be convenient, as it may allow the electronic device 12 to be kept at a remote location (e.g. in a pocket or a purse) while still being controlled by the user who has access to the accessory 14.

In some embodiments, the accessory 14 may include a microphone 30 for receiving audio signals and for sending those audio signals to the electronic device 12. As shown, the microphone 30 may be provided at or with the user control interface 20. Alternatively, the microphone 30 may be provided at another location on the accessory 14.

In some embodiments, the headset accessory 14 is connected to the electronic device 12 using a conventional audio plug (on the accessory 14) coupled to a corresponding audio jack (on the electronic device 12). In some embodiments, the plug and jack can be of the tip-ring-sleeve (TRS) variety, or a tip-ring-ring-sleeve (TRRS) variety, or other various types. For example, some audio connectors are in the form of 3.5 mm (⅛") miniature plugs and jacks, or other sizes such as 2.5 mm connectors and ¼" connectors. In headsets and other accessories, these audio connectors are generally used to carry analog audio signals between the speakers 16, 18, the microphone 30 and the electronic device 12.

As described above, some prior control solutions allowed the accessory 14 to control the electronic device 12 by shorting buttons on the microphone line to send control signals to the electronic device 12. However, this approach tends to interfere with the audio signals sent by the microphone and produce undesirable audio effects (e.g. pops or clicks).

In lieu of this approach, according to at least some embodiments herein, the accessory 14 includes a tone generator 28 for sending control signals to the electronic device 12.

As shown in FIG. 2, the tone generator 28 may be in communication with the buttons 22, 24, and 26. When a user makes an input (e.g. by pressing one or more of the buttons 22, 24, 26), the tone generator 28 detects the input and generates a corresponding control tone. This control tone is then sent to the electronic device 12 (e.g. via the microphone line), where it is interpreted as a control signal, and the corresponding action can then be executed by the electronic device 12.

In some embodiments, the control tone has a frequency that is selected so as to be substantially inaudible to a user using the accessory 14. For example, the control tone may comprise an ultrasonic tone that is above the hearing range of an average human (usually around between 20 Hz and 20 kHz). As such, the control tone may be referred to as an "out-of-audible band" control tone. In other embodiments, other control tones may be used (e.g. in-audible band tones may alternatively be used, although these may tend to produce undesirable audio effects).

Generally, the frequency of the control tone will be selected depending on the particular input selected (e.g. which button 22, 24, 26 was pressed).

By sending control tones to the electronic device 12 that are out-of-audible band, there is generally no need to ground the microphone line to send control signals and therefore undesirable noise effects can be inhibited or avoided. Furthermore, the frequency of the control tone may be selected so that the user will generally not perceive the control tone. Accordingly, the user may control the electronic device 12 using the accessory 14 even when using the accessory 14 for another purpose (such when participating in a telephone call) generally without experiencing undesirable audio effects.

However, in some cases it can be difficult to accurately generate the desired control tones on the accessory 14. More particularly, accessories 14 are often inexpensive items with low cost components, and it can be difficult for the low cost components on the accessory 14 to produce highly accurate tones. This is problematic, as any analog variation or other errors introduced to the control tone by the accessory 14 (e.g. due to drifting of the tone generator 28 or other problems) may make it difficult for the electronic device 12 to properly interpret the control tone(s). This may cause the electronic device 12 to discard the control tones or misinterpret a particular control tone as a different control tone and then take the wrong action (e.g. increasing playback volume when the user was trying to lower the volume).

Figure 3:
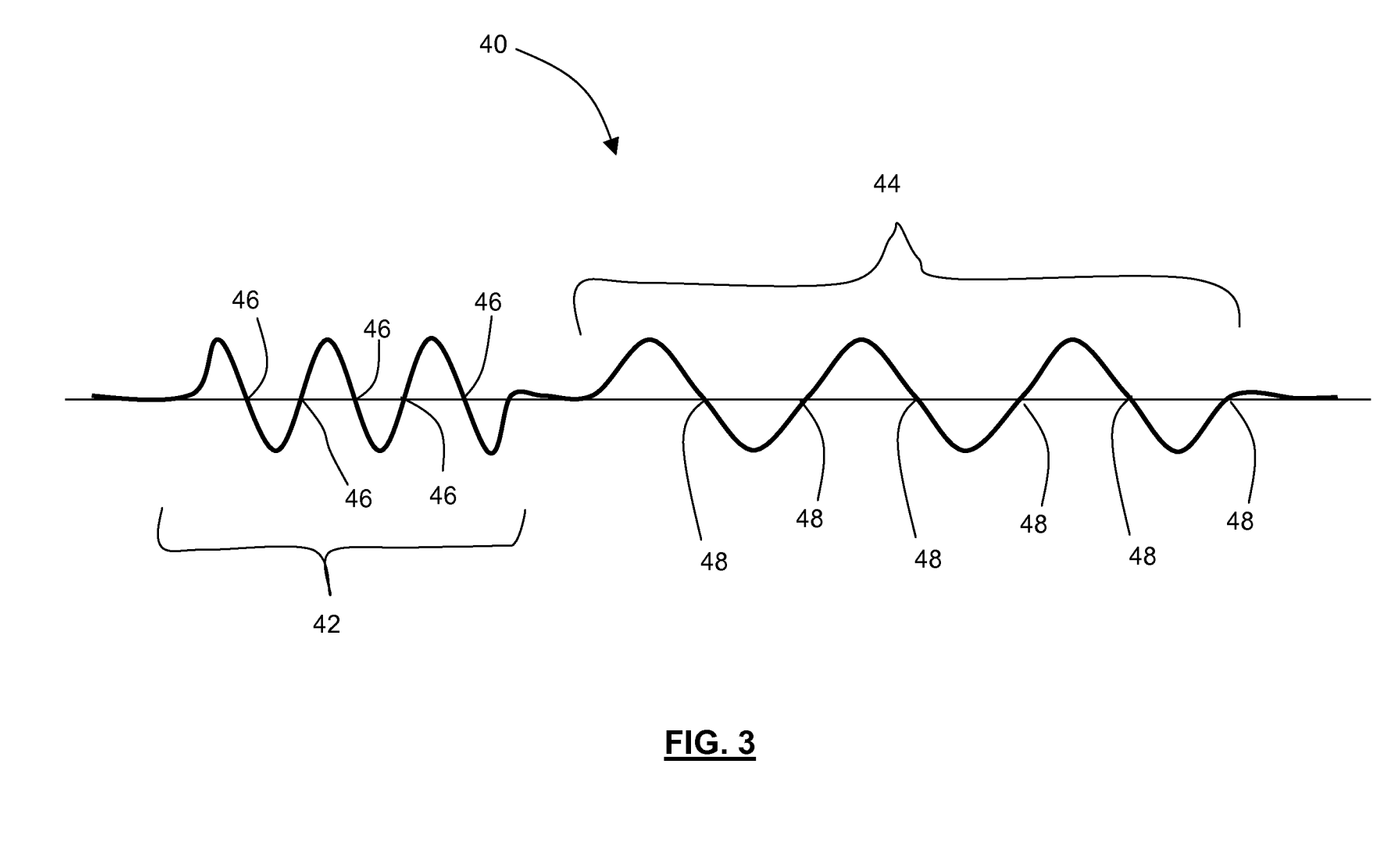
FIG. 3 is a schematic representation of a control tone and a calibration sequence according to one embodiment.

One solution to this problem is for the accessory 14 to send the control tone to the electronic device 12 along with a corresponding calibration sequence. For example, an exemplary signal 40 is shown in FIG. 3. In this embodiment, the control tone 44 comprises an ultrasonic signal (e.g. a signal with a period of approximately 10 microseconds, or another period that is "out-of-audible" band), and is accompanied by a calibration sequence 42.

The calibration sequence 42 may also comprise an "out-of-audible band" signal generated by the tone generator 28. For example, the calibration sequence 42 may comprise an ultrasonic signal (i.e. a signal with such a short period that it is not audible). In some embodiments tones with a period of approximately 2 microseconds to approximately 30 microseconds may be used as calibration sequences 42, control tones 44, or both. The higher value (e.g. approximately 30 microseconds) may be chosen so that the calibration sequence 42 and control tone 44 are not audible, while the lower value (e.g. approximately 2 microseconds) may be chosen based on practical circuit limitations (since it may be easier to measure a period of a long duration signal more accurately than a signal with a very short duration).

As shown, in some embodiments the calibration sequence 42 may be sent to the electronic device 12 before the control tone 44 is sent. In other embodiments, the calibration sequence 42 may be sent after the control tone 44. In other embodiments, the calibration sequence 42 and control tone 44 may at least partially overlap.

By sending a calibration sequence 42 in addition to the control tone 44, the electronic device 12 may compensate for analog variation or other errors that may occur when generating the control tone 44.

In particular, the calibration sequence 42 can be used by the electronic device 12 to calibrate the control tone 44. For example, the calibration sequence 42 may be set to be at a particular period that is known to the electronic device 12 (e.g. approximately 3 microseconds). When the electronic device 12 detects the calibration sequence 42, the actual received tone duration (e.g. approximately 3.3 microseconds) can be measured and used to compensate for any variation that may have been introduced to the control tone 44 by the tone generator 28 (or other components or circuitry of the accessory 14). In some embodiments, this can be done if the calibration sequence 42 and control tone 44 are both derived from the same internal components in a chip of the accessory 14 thereby tending to eliminate inaccuracies in the manufacture of such circuits (and which may help reduce the cost of manufacturing the accessory 14), or if both tones are derived from the same clock circuit.

In some embodiments, the compensation may involve comparing the ratio of the frequencies of the control tone 44 and the calibration sequence 42. For example, two different frequencies may be identified (e.g. the frequency of the calibration sequence 42 and the control tone 44), and the electronic device 12 can then determine the ratio between the measured frequencies to determine what particular button (e.g. button 22, 24, or 26) was pressed. Since both the calibration sequence 42 and control tone 44 should be subjected to the same analog variation or errors within the circuitry generating the sequences (e.g. the tone generator 28), a more accurate representation of the actual button pressed can generally be obtained. However, using this approach involves counting the number of pulses within a given time interval (e.g. to obtain the frequency information of the calibration sequence 42 and control tone 44), and the absolute resolution of the measurement is therefore limited.

Therefore, according to at least some embodiments as described herein another approach is proposed. In particular, the electronic device 12 may use phase information of the received signals (e.g. calibration sequence 42 and control tone 44) to provide for a more accurate measurement. By measuring the period instead of the frequency, a measurement can be obtained whose accuracy is only limited by the accuracy and duration of an internal clock and any external noise, and which is not limited to +/− one count within a certain time window. This means that within a given time window, more accurate measurements can generally be obtained (as compared to a frequency measurement).

Phase information can be obtained by measuring the zero-crossings of the received pulses (e.g. zero crossings 46 and 48 of the calibration sequence 42 and control tone 44, respectively, as shown in FIG. 3), using the zero crossings to determine the periods for the calibration sequence 42 and control tone 44, and then comparing the ratio of the periods of the calibration sequence 42 and control tone 44 to determine what input was actually being sent.

In various embodiments, this can be implemented in at least one of three ways: i) by measuring the period of both the control sequence and the calibration tone, ii) by measuring the frequency of the control sequence and the period of the calibration tone, or iii) by measuring the period of the control sequence and the frequency of the calibration tone.

In some cases, one accurate method may be to measure the period of both the calibration tone 42 and the control tone 44. In particular, a measurement circuit can use information about the rising edges from the zero-crossing detector to determine the period length, use the falling edges of the zero crossing detection to determine the period length, or use both rising and falling edges from the zero-crossing detector, and thereby determine half the period length.

In yet another embodiment the actual phase of the incoming calibration sequence 42 and control tone 44 may be measured and used to improve the period length determination. In this manner, an accurate measurement of the calibration tone 44 can be obtained (in some cases in as little as half a wavelength, although normally at least one wavelength may be used to calibrate for offsets that may be internal to the electronic device 12, the accessory 14, or both).

Figure 4:
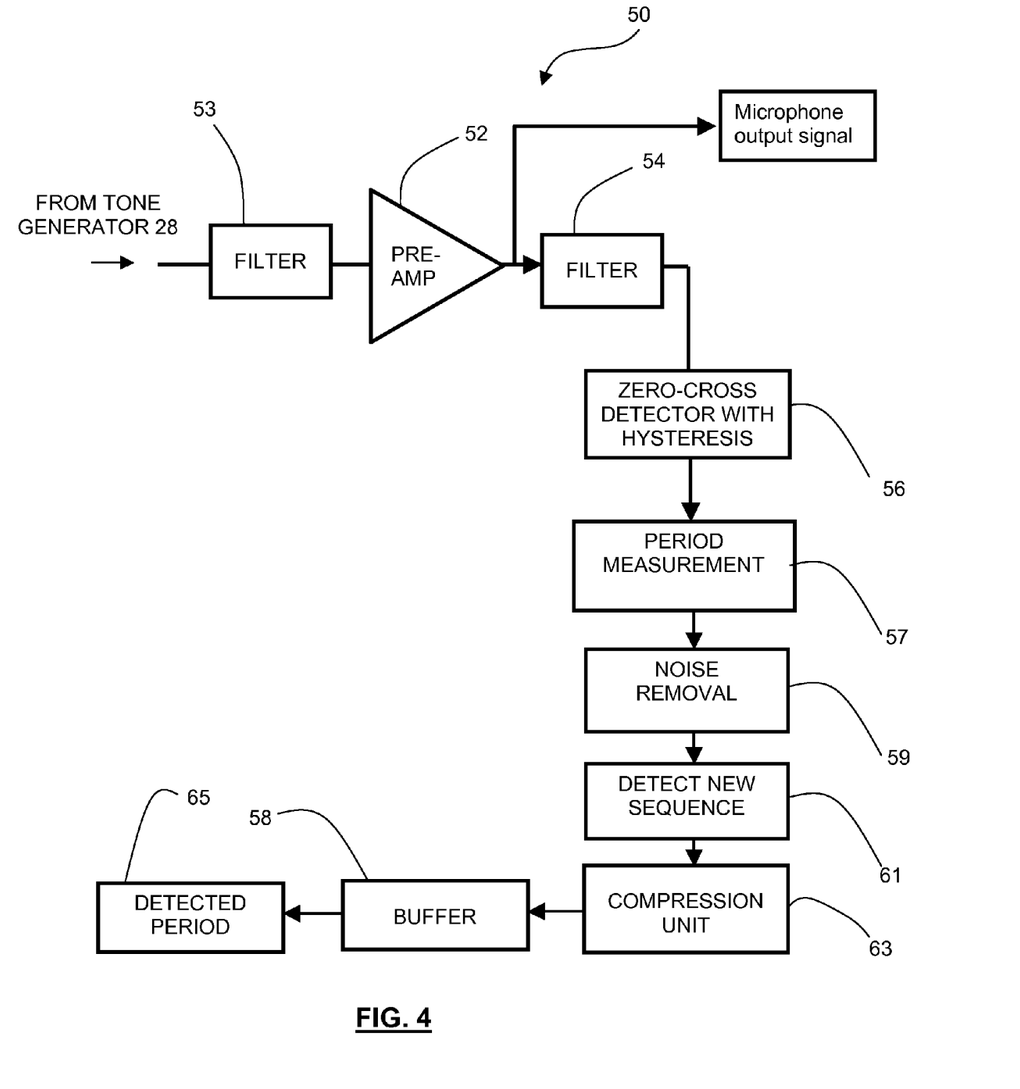
FIG. 4 is a schematic representation of an electronic device having a zero crossing detector, a period measurement unit with noise rejection and a buffer, and being operable to detect the control tone and calibration sequence.

In order to quickly detect and identify the periodic sequences (e.g. the calibration sequence 42 and the control tone 44), an electronic circuit or software application on the electronic device 12 (or both) can be used. One example circuit 50 is shown in FIG. 4.

In this embodiment, zero-crossing information may be obtained by measuring the output of a pre-amplifier such as a microphone pre-amplifier 52. This may be convenient since the pre-amplifier 52 may already be integrated next to the audio jack on the electronic device 12. This may prevent having to add additional hardware components to the electronic device 12 and may make for a more robust implementation.

Furthermore, by performing the zero-crossing detection after an amplification of the input signal, the absolute requirements for the zero-crossing detection circuit will tend to be less stringent with respect to noise, offset, accuracy and silicon area, since the microphone pre-amplifier 52 will typically already have low noise and low offset. The pre-amplifier 52 should have a bandwidth that is large enough to pass tones with the shortest period that is to be used (e.g. typically approximately 2 microseconds, although in some embodiments this may be shorter or longer).

If the gain in the pre-amplifier 52 is too large, the amplified signals will be clipped due to limitations in the circuit 50 and noise may influence the overall signal quality. However, if the gain of the pre-amplifier 52 is too low, there may be little advantage in using the pre-amplifier 52. As a practical compromise, gains in the range of approximately 12 dB to approximately 30 dB may be used for some embodiments, in some particular cases with a value of approximately +24 dB.

In some embodiments, the incoming signal (including the calibration sequence 42 and control tone 44) may be high-pass filtered by a filter 53 before the microphone pre-amplifier 52 in order to remove large DC-signals.

In some embodiments, the output from the pre-amplifier 52 may be passed to a first-order (or higher-order) high-pass filter 54 (e.g. in some embodiments a 30 kHz high-pass filter) in order to attenuate particular undesired signals (e.g. signals in the audible audio band). The resulting output signal is then monitored by a zero-crossing detector 56 that detects the zero-crossings (e.g. zero-crossings 46, 48). The output from the zero-crossing detector 56 will be described further below.

In some embodiments, the zero-crossing detector 56 includes a hysteresis in order to minimize or at least reduce the influence of any electric noise or acoustic noise (or both) by requiring the noise level to be very large before giving a false zero-crossing.

As shown, the circuit 50 may include a period measurement module 57 (for determining the period of the calibration sequence 42 and control tone 44 based on the information received from the zero-crossing detector 56).

As shown, the circuit 50 may also include a noise removal module 59 for ignoring pulses that are too long or too short (e.g. glitches), or both, and thereby reduce the influence of electrical and acoustic noise on the overall signal quality.

As shown, the circuit 50 may also include a new sequence detector 61 for detecting whether a new sequence or tone has been detected (and not simply a continuation of the previous tone). For example, a minimum change in a period may need to be observed by the new sequence detector 61 before a new tone will be identified.

As shown, the circuit 50 may also include a buffer 58 (e.g. a cyclic buffer), so that multiple button presses may be read (e.g. by system software on the electronic device 12, even if the electronic device 12 takes some time to wake up from sleep).

In some embodiments, the circuit 50 may include a compression unit 63 positioned before the buffer 58 for limiting the number of bits stored in the buffer 58 to save storage space and decrease the time taken to read a period value.

As shown, in some embodiments the circuit 50 may then output the detected period(s) 65 so that further processing can be performed (e.g. the desired input may be executed).

Figure 5:
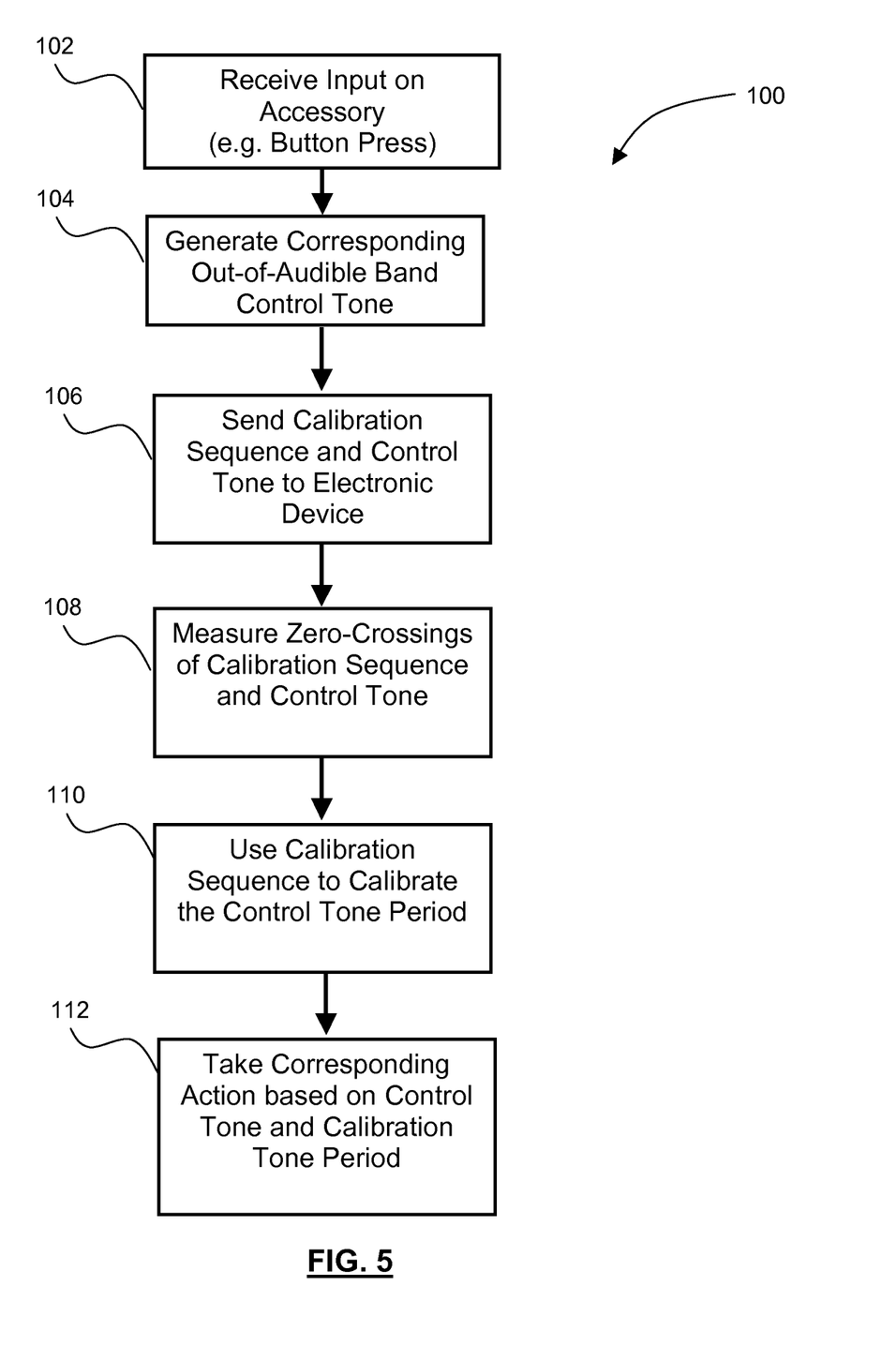
FIG. 5 is a schematic representation of a method of controlling an electronic device using an accessory according to some embodiments.

Turning now to FIG. 5, illustrated therein is a method 100 of controlling an electronic device (e.g. electronic device 12) using an accessory (e.g. headset accessory 14) according to some embodiments.

At step 102, an input is received by the accessory. For example, a user may press one of the buttons 22, 24, 26 on the user control interface 20 of the accessory 14.

At step 104, an out-of-audible band control tone is generated based on the input received at step 102. For example, the tone generator 28 may generate a particular ultrasonic control tone 44 with a certain period (e.g. 10 microseconds) that is selected based on the particular button 22, 24, 26 that was pressed.

At step 106, the control tone and a calibration sequence are sent to an electronic device. For example, the calibration sequence 42 and control tone 44 may be sent to the electronic device 12 over the microphone line of the accessory 14.

At step 108, the electronic device receives the control tone and calibration sequence, and measures zero crossings to detect phase information about the control tone and calibration sequence. For example, a first periodic sequence (e.g. the calibration sequence 42) or second periodic sequence (e.g. the control tone 44) may be found by detecting periodic sequences within some particular limits (e.g. between approximately 2 microseconds and approximately 30 microseconds).

In some embodiments, any measured period outside these particular limits (e.g. less than approximately 2 microseconds or greater than approximately 30 microseconds) may be rejected in order to make the circuit more immune to electric and acoustic noise. For example, any acoustic noise will tend to be translated into electric noise by any attached microphone (e.g. microphone 30) preceding the pre-amplifier (e.g. pre-amplifier 52) thereby also making the circuit (e.g. circuit 50) susceptible to acoustic noise. Hysteresis in the zero-crossing detector (e.g. zero-crossing detector 56) will tend to make the circuit ignore any noise with an amplitude less than the hysteresis window height. However, if the hysteresis window is too large, the tone will not be detected. Therefore, the window height may be selected to be a compromise between reliable detection and noise immunity.

In some embodiments, a hysteresis of approximately 120+/−30 mV after amplification of approximately 24 dB may be a good compromise between reliable detection and high noise immunity.

In some embodiments, the calibration sequence 42 may be accepted as a valid sequence only if the measured period is confirmed to be the same in a second measurement, within certain tolerance limits for higher noise immunity and to decrease the influence of transient conditions, such as the exact start of a tone (although this step may be omitted).

In order to detect that a new period has been received (and not just the continuation of the same tone), the start of a new sequence (e.g. the control tone 44) may be determined by detecting a minimum change in a period (e.g. +/−4 least significant bits (LSB)) to determine that it is indeed a period associated with a new tone.

In some cases, the period measurement module 57 may be followed by a cyclic buffer unit or FIFO (e.g. buffer 58) in order to decrease the latency requirements of any processor that reads the period values, since multiple values may be detected before the processor reads them.

In some embodiments, the measured period may be saved in the cyclic buffer to decrease the minimum requirements with respect to latency of the system that reads the measured period values.

In some embodiments, the period measurement module may be followed by a compression unit (e.g. compression unit 63) that limits the number of bits stored in the buffer to save storage space and decrease the time taken to read a period value (e.g. by transferring less bits).

In some cases, the compression unit should be implemented so that small period values do not suffer any compression while larger values will be shortened (e.g. so that the least significant bits are removed). This may enable a better accuracy of the measured values when the particular word length is limited. For example, 10-bit values may be compressed to 8-bits by passing values of bits 1-8 unaltered if bit 8 is zero and letting the highest values (e.g. 256-1023 values) be passed by dividing by four and setting the MSB output (e.g. bit 7) to one. Further accuracy may be gained by adding the LSB of the input word to the output word when the output MSB is zero for better rounding.

In some embodiments, the first sequence (e.g. calibration sequence 44) may be measured again (e.g. a second time) in order to improve noise immunity (although in other embodiments this step may be omitted).

In some embodiments, the second sequence (e.g. control tone 44) may be measured again (e.g. a second time) in order to improve noise immunity (although in other embodiments this step may be omitted).

At step 110, the calibration sequence 42 and the control tone 44 may be used to calibrate for analog variation or other errors that may have occurred in the transmitter circuitry, and to accurately determine the actual input (e.g. what button was pressed).

For example, by reading the two measured periods (e.g. from the calibration sequence 42 and the control tone 44), the electronic device 12 can determine the correct button pressed. In some embodiments, this is based on taking the ratio of these two periods: the period of the calibration sequence 42 and of the control tone 44.

Accordingly, using at least some of the embodiments as described herein, it is possible to both find the periods of the calibration sequence 42 and the control tone 44 quickly and accurately, and also correct for the analog variations of the transmitter circuitry (e.g. analog variation or other errors in the tone generator 28).

At step 112, the corresponding action can be executed. For example, the electronic device 12 may take appropriate action (e.g. increase or decrease playback volume) depending on the particular input made at step 102.

Figure 6:
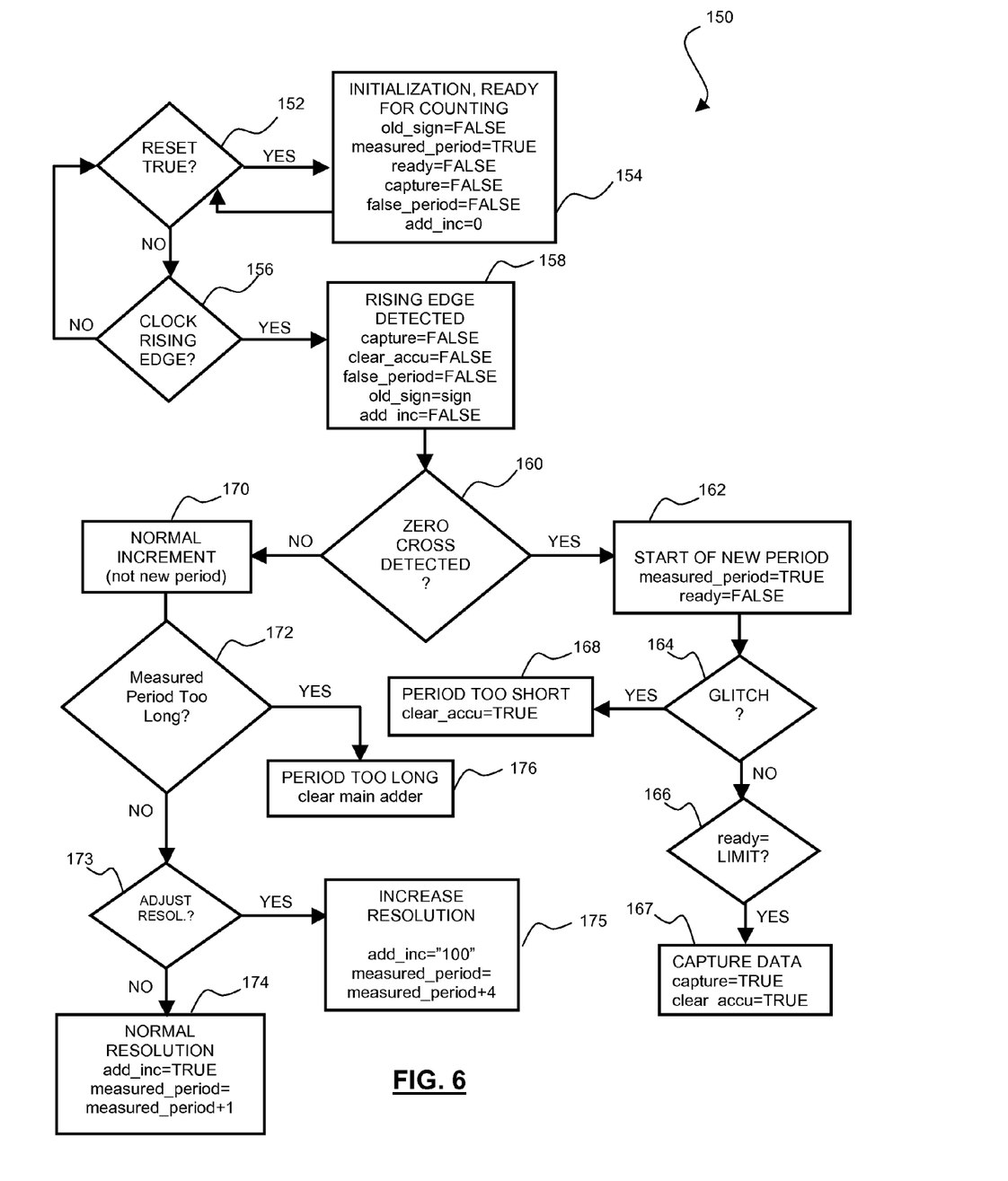
FIG. 6 is a schematic representation of a method of measuring a period for controlling one or more aspects of an electronic device according to one embodiment.

Turning now to FIG. 6, illustrated therein is a method 150 for measuring a period for controlling one or more aspects of an electronic device according to one embodiment.

As a preliminary step, at step 152, a determination is made as to whether a reset event has been triggered. If true, the method 150 then proceeds to step 154 where various variables associated with the method 150 are initialized. However, if no reset event has been triggered, the method 150 proceeds to step 156.

At step 156, a determination is made as to whether a rising edge has been detected. If no rising edge has been detected, the method 150 then returns to step 152. However, if a rising edge has been detected, then the method 150 then proceeds to step 158.

At step 158, a rising edge has been detected. The method then proceeds to step 160.

At step 160, a determination is made as to whether a zero crossing has been detected. For example, the signs (positive or negative) of the signal may be monitored to determine whether a zero crossing has been detected. If a zero crossing has been detected, the method 150 then proceeds to 162 and a new period has started. However, if no zero crossing has been detected at step 160, the method 150 then proceeds to step 170.

At step 164, a determination may be made to ensure that the period is above a particular threshold. For example, very short periods may in fact be errors, and may be ignored. In some embodiments, this may be done by comparing the measured period to a lower period threshold (e.g. approximately 2 microseconds). If the measured period is less than the lower period threshold, this may indicate a glitch and the method may proceed to step 168 (where it is flagged as a glitch for being too short and may be disregarded). However, if the measured period is greater than the lower period threshold, then the method may proceed to step 166.

At step 166, a determination may be made as to whether the signal is ready for capturing (e.g. data may be suitable for capturing after a particular number of 'clean' periods or half-periods have been observed, in some cases using 16 periods). If ready, the method 150 then proceeds to step 167.

At step 167, period data may be captured for subsequent processing. In some embodiments, the method 150 may then repeat (e.g. looping back to step 152).

At step 170, no zero crossing has been detected (e.g. no new period has been detected) and thus the method 150 determines that the signal is undergoing a normal increment (e.g. the signal is still within a particular period and no new period has been detected).

At step 172, a determination is made as to whether the current period has reached a particular threshold (e.g. is too long). For example, an upper period threshold may be set (e.g. approximately 30 microseconds) and the current length of the measured period may be compared to the upper period threshold. If the measured period is longer than the upper period threshold (e.g. greater than approximately 30 microseconds), then the method 150 may proceed to step 176 where it is noted that the measured period is too long and can be discarded.

However, if the measured period is shorter than the upper period threshold (e.g. less than approximately 30 microseconds), the method 150 may proceed to step 173.

At step 173, a determination can be made whether the resolution is to be increased. For example, in some embodiments, two incremental values may be used, starting with a larger incremental value (e.g. four) and using a lower incremental value (e.g. one) after a certain period length. This way, the values will be compressed, resulting in larger accuracy to smaller periods. In such embodiments, the same increment value should be used for the accumulator.

If at step 173 the resolution is to be increased, the method 150 proceeds to step 175, where the resolution is increased when measuring the period length. Otherwise, the method 150 proceeds to step 174, and a normal resolution is used to measure the period.

In some embodiments, after steps 174 and 175, the method 150 may then loop back (e.g. to step 152).

Figure 7:
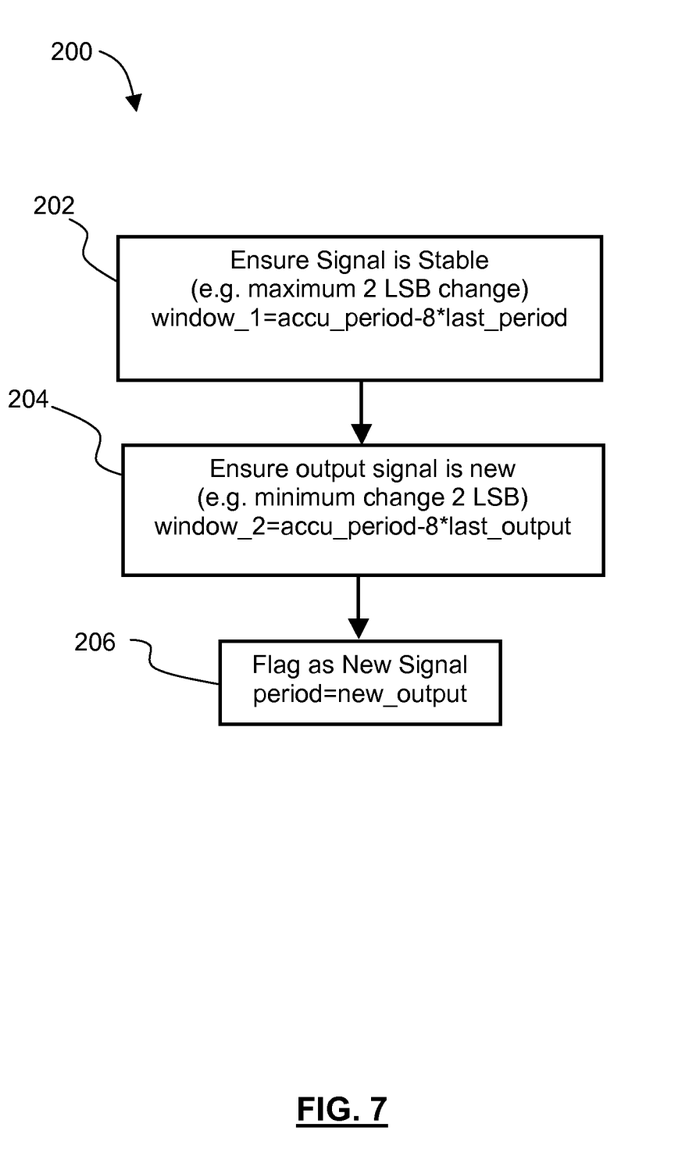
FIG. 7 is a schematic representation of a method of checking whether a signal is stable and whether a new signal has been detected.

Turning now to FIG. 7, illustrated therein is a general method 200 of checking whether a signal is stable and whether a new signal has been detected For example, at step 202, a determination is made whether the observed signal is stable. For example, a maximum 2 least-significant-bit (LSB) change may be required before the observed signal will be characterized as stable. Once the signal is stable, the method 200 may proceed to step 204.

At step 204, a determination is made as to whether the output signal is a new signal (e.g. indicating that a new tone has been detected). For example, a minimum 2 LSB change may be required before a determination will be made that a new signal (e.g. the control tone 44) has been detected. Once a new signal has been detected, the method 200 may proceed to step 206, where the method 200 flags that the new signal has been detected.

Figure 8:
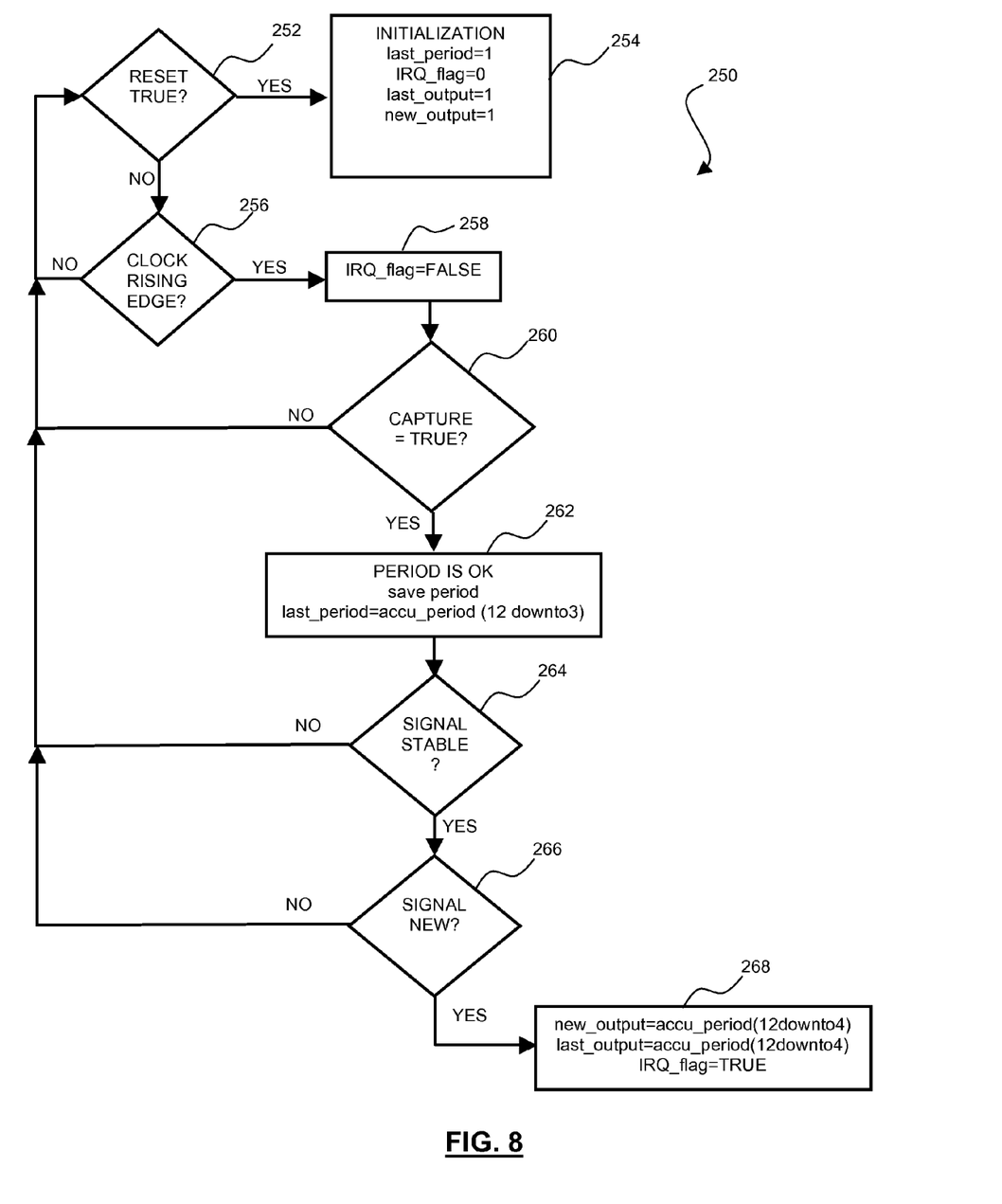
FIG. 8 is a schematic representation of a method of measuring a period by adding time for all the periods according to one embodiment.

Turning now to FIG. 8, illustrated therein is a method 250 of determining the periods by adding the time for all periods.

At step 252, a determination is made whether reset event has occurred. If true, the method 250 then proceeds to step 254, where various variables associated with the method 250 are initialized. However, if no reset event has been triggered, the method 250 can proceed to step 256.

At step 256, a determination is made as to whether a rising edge has been detected. If no rising edge has been detected, the method 250 then returns to step 252. However, if a rising edge has been detected, then the method 250 then proceeds to step 258

At step 258, further initialization may be performed (e.g. setting the IRQ flag to false).

At step 260, a determination is made as to whether the averaged period is acceptable and should be saved. This is based on an earlier detection of the length of the individual measured periods. In some implementations, all the measured periods (e.g. 16 periods) should be valid as detected by being within certain limits, neither too short nor too long (e.g. between approximately 2 and approximately 30 microseconds). If so, the method 200 proceeds to step 262, where the averaged period may be saved. If not, however, the method 250 may then loop back to step 252.

At step 264, a determination is made as to whether the measured signal is stable. If so, the method 200 then proceeds to step 266. If not, the method 200 may then loop back to step 252.

At step 266, a determination is made as to whether the measured signal is a new signal. If so, the method 200 then proceeds to step 268. If not, the method 200 may then loop back to step 252.

At step 268, then the new signal may be stored for further processing. In some embodiments, the method 250 may then loop back to step 252.

Figure 9:
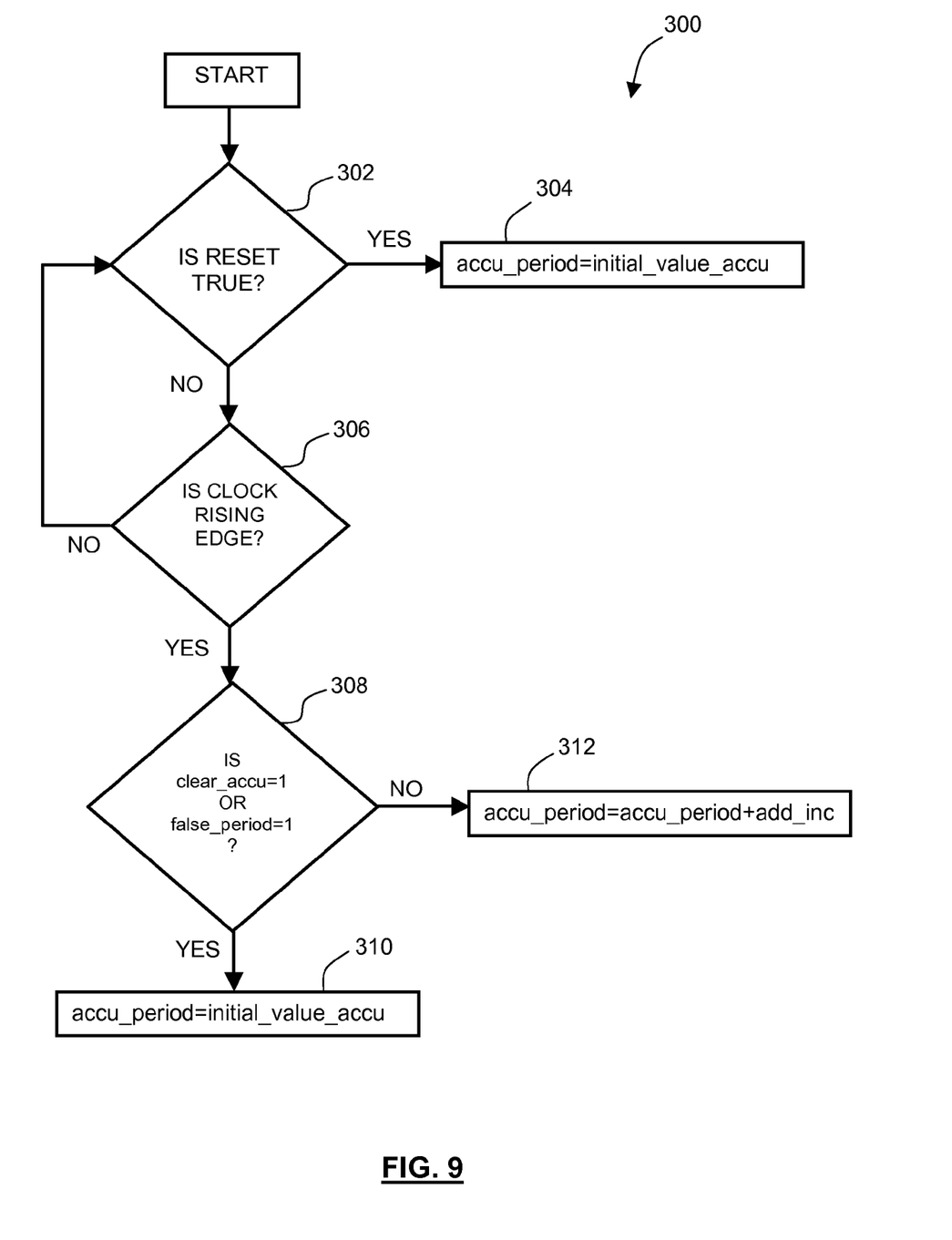
FIG. 9 is a method of measuring a period according to another embodiment.

Turning now to FIG. 9, illustrated therein is a method 300 for measuring a period for controlling one or more aspects of an electronic device according to another embodiment.

At step 302, a determination is made whether reset event has occurred. If true, the method 300 then proceeds to step 304, where one or more variables associated with the method 300 are initialized. However, if no reset event has been triggered, the method 300 proceeds to step 306.

At step 306, a determination is made as to whether a rising edge has been detected. If no rising edge has been detected, the method 300 then returns to step 302. However, if a rising edge has been detected, then the method 300 then proceeds to step 308

The accumulator serves the purpose of calculating an average of several measured and valid periods. At step 308, a determination is made as to whether a false period has been detected or whether the accumulator should be cleared. If so, the method 300 proceeds to step 310, where the accumulator may be restored to its initial value. If not, the method 300 proceeds to step 312, where the accumulator may be incremented. Thus, in order for the accumulator to increment, all the measured periods should generally be within certain limits.

In some embodiments, certain types of accessories (e.g. headsets commonly used on airlines) may not be compatible with certain electronic devices, and vice versa. In particular, in some cases, non-standard pin and ring configurations may be used, which may lead to unexpected or even erroneous performance. In such embodiments, it may be possible to correct for at least some of these effects by using an adaptor to compensate for the pin configurations. In other such embodiments, the electronic device may be configured with an adjustable setting that can be used to compensate for such non-standard accessories.

Furthermore, in some embodiments if other information in addition to button presses (e.g. the release time of buttons or other information), is also transmitted using high frequency pulses, this information may be filtered away, for example by using a digital control circuit after determining which tone pulses contain key information and which tone pulses do not. This may allow the receiver to interpret different key presses without being confused by this additional information.

In some embodiments, these additional tone sequences may be interpreted by using period measurement, thereby determining the information content of these pulses and afterwards passing this additional information on to the processor that receives and interprets the key information from an accessory.

In some embodiments, the system may be configured for biasing the external device (e.g. an accessory, such as the accessory 14) with two voltage levels, a first voltage level and a second voltage level (e.g. by applying bias voltages). The first voltage level may be a signal to "wake up" and activate the external device and a second lower voltage level may be used to detect an absence or presence of the external device (e.g. has the accessory 14 been removed from the electronic device 12.

In some embodiments, the system may be configured for biasing the external device with a sufficiently high bias voltage and detecting the presence of the external device by detecting a valid period value after powering on the external device.

One or more embodiments may realize one or more advantages. Such advantages may be illustrated by comparison to similar (but functionally and practically different) systems, apparatus and methods that measure a frequency (as may be described in U.S. Pat. No. 7,627,128) rather than the period of the control tone.

Although mathematically, the frequency and the period of a tone are related, there are numerous practical and non-trivial differences and benefits that may result from measuring a period rather than a frequency.

For instance, generally speaking, a frequency may be measured by counting pulses or cycles during a predefined known time interval. On the other hand, a period may be determined by measuring the time taken to count a particular number of pulses or cycles (e.g., measuring the time between zero crossings). Put another way, determining the period of the control tone (the period being measured in units of time) involves measuring the time for a particular number of pulses or cycles to occur.

There are several practical differences between measuring the frequency of a control tone and measuring its period. One difference is precision. When the frequency is measured by counting an unknown number of pulses (creating a "pulse count") during a known time interval, some round-off error may occur. Colloquially speaking, the "pulse count" will generally be an integer, and fractions of pulses (which could be relevant to accurately measuring frequency) might not be counted at all. In contrast, when measuring a period (e.g. the time taken for a known number of pulses to occur), this value can normally be measured with significantly greater precision, and in particular need not be (for example) an integer number of microseconds, since clocks are often precise enough to measure very small fractions of time. Consequently, the use of period rather than frequency may result in smaller round-off errors and lead to greater measurement accuracy.

One way to reduce these round-off errors that occur when measuring frequency is to count pulses during a longer time interval. However, since it may be contemplated that several frequencies might have to be measured, this longer time interval would generally have to be long enough to accommodate measurement of the lowest frequency (or "worst" frequency). As a result, attempts to increase accuracy when measuring frequency may involve significantly extending the time interval required to make a measurement. In contrast, when measuring the period, such long measurement time intervals may not be necessary. Specifically, when measuring a period, a precise measurement may be obtained within a shorter time interval. As an example, it may be possible to accurately determine the period of a tone by utilizing as little as a single cycle while multiple cycles are needed when measuring frequency by counting the number of pulses in a particular time interval (e.g. 100 pulses may be needed in a frequency measurement for 1% accuracy). Thus, by measuring period the accuracy is merely limited by the available internal reference clock and the signal-to-noise ratio of the measured signal, while a frequency measurement is limited in accuracy by the signal-to-noise ratio and inversely proportional to the measurement time. Moreover, it may also be feasible to take two or more measurements of the period within the same time interval (or even a shorter time interval) than may be used when trying to measure a frequency. Another prospective advantage of the teachings herein, therefore, is that it may take less time to accurately measure a period as opposed to measure a frequency.

A third prospective difference is in handling of noise. Noise may affect the measurement of the calibration sequence or the control tone, or both. Noise may, for example, cause a pulse or cycle to be counted even though there was no valid pulse or cycle, which can impact both frequency and period measurements. However, as already mentioned, it may take less time to make measurements when measuring period rather than frequency, so multiple period measurements may be taken within the same time interval, making period measurement a more robust approach. In particular, by comparing multiple period measurements, noise that might affect the validity or stability of the calibration sequence or control tone may be detected and the noise contaminated measurements may be discarded (e.g., by taking a second or other measurement).

For example, in some embodiments, the period of individual cycles may be measured, and cycles with periods too long or too short may be disregarded as meaningless. In particular, a cycle that is too long might be deemed to be part of an audio signal, for example, rather than a command. Conversely, a cycle that is too short might be deemed to be due to noise. Measurement of the period may support detection that a tone has changed (e.g., from a calibration sequence to a control tone, or vice versa), and whether a tone is stable (which may indicate that the tone has meaning). The determination of whether a tone is stable can be done by comparing two period measurements and only accepting the value if they do not differ too much in value. A decision can then be made to only accept this value as a new tone value, if these two measurements differ sufficiently from earlier accepted values (i.e. the second is not the same tone as the first). In other words, measurement of the period may enable ready detection of a transition between a valid, stable calibration sequence and a valid, stable control tone, or vice versa. In these and other ways, measuring the period may be less prone to error than measuring frequency. There may be other prospective benefits as well.

The foregoing aspects of the method and the electronic device are provided for exemplary purposes only. Those skilled in the art will recognize that various changes may be made thereto without departing from the spirit and scope of the method and the electronic device as defined by the appended claims.

The invention claimed is:

1. A system for controlling an electronic device, the system comprising:
    an accessory coupled to the electronic device, the accessory having a user control interface for receiving at least one input, and a tone generator;
    the accessory configured to, in response to an input, generate a corresponding control tone using the tone generator, and send the control tone and a calibration sequence to the electronic device;
    the electronic device operable to receive the calibration sequence and control tone, and including a zero-crossing detector operable to determine at least one of the start or ending of each of the calibration sequence and the control tone and having a circuit operable to determine the periods of the calibration sequence and the control tone based on the zero-crossing detector output;
    the electronic device further operable to compensate for errors in the control tone based on the periods of the calibration sequence and the control tone to determine the input, and then execute an action based on the input;
    the system configured for biasing the accessory with a bias voltage and detecting the presence of the accessory by detecting a period value after powering on the accessory.

2. The system of claim 1, wherein the period of the control tone is selected so as to be substantially inaudible to a human user.

3. The system of claim 1, wherein the period of the calibration sequence is selected so as to be substantially inaudible to a human user.

4. The system of claim 1, wherein the electronic device compensates for errors in the control tone by taking the ratio of the measured periods of the calibration sequence and the control tone to determine the input.

5. The system of claim 1, wherein the electronic device includes a microphone pre-amplifier, and the zero-crossing detector is positioned after the microphone pre-amplifier.

6. The system of claim 5, wherein the electronic device includes a high-pass filter and the calibration sequence and control tone are passed through the high-pass filter to avoid large DC-signals being sent to the microphone pre-amplifier.

7. The system of claim 5, wherein the output from the microphone pre-amplifier is passed to a first-order or higher-order high-pass filter to attenuate signals in the audio band.

8. The system of claim 1, wherein the zero-crossing detector includes a hysteresis in order to decrease the influence of at least one of electric noise or acoustic noise.

9. The system of claim 8, wherein the output from the period measurement module is filtered, so that only periods within a certain time window are accepted to decrease any false detection.

10. The system of claim 1, configured for biasing the accessory with two voltage levels, a first voltage level to activate the accessory and a second lower voltage level used to detect an absence or presence of the accessory.

11. A method for controlling an electronic device, the method comprising:
    receiving an input;
    in response to receiving the input, generating a corresponding control tone using a tone generator;
    sending the control tone and a calibration sequence to the electronic device;
    receiving the calibration sequence and control tone at the electronic device;
    determining periods of the calibration sequence and the control tone using a zero-crossing detector;
    compensating for errors in the control tone based on the periods of the calibration sequence and the control tone to determine the input; and
    executing an action based on the input.

12. The method of claim 11, wherein the period of the control tone is selected so as to be substantially inaudible to a human user.

13. The method of claim 11, wherein the period of the calibration sequence is selected so as to be substantially inaudible to a human user.

14. The method of claim 11, wherein the compensating for errors in the control tone includes taking the ratio of the periods of the calibration sequence and the control tone to determine the input.

15. The method of claim 11, further comprising filtering the calibration sequence and control tone with a high-pass filter to remove large DC-signals.

16. The method of claim 11, further comprising filtering the calibration sequence and control tone to attenuate signals in the audio band.

17. The method of claim 11, wherein the calibration sequence is sent before the control tone.

18. The method of claim 11, wherein the calibration sequence is sent after the control tone.

19. A system for controlling an electronic device, the system comprising:
    an accessory coupled to the electronic device, the accessory having a user control interface for receiving at least one input, and a tone generator;
    the accessory configured to in response to an input, generate a corresponding control tone using the tone generator, and send the control tone and a calibration sequence to the electronic device;
    the electronic device having a pre-amplifier;
    the electronic device operable to receive the calibration sequence and control tone, and including a zero-crossing detector positioned after the pre-amplifier operable to determine at least one of the start or ending of each of the calibration sequence and the control tone and having a circuit operable to determine the periods of the calibration sequence and the control tone based on the zero-crossing detector output;
    wherein the output from the zero-crossing detector is fed to a period measurement module;
    the electronic device further operable to compensate for errors in the control tone based on the periods of the calibration sequence and the control tone to determine the input, and then execute an action based on the input.

20. The system of claim 19, wherein the output is averaged over a number of zero-crossings in order to decrease the influence of any noise.

21. The system of claim 20, wherein the averaged output is measured twice and first accepted when two averaged measurement differ less than a certain time window to decrease the influence of transient conditions.

22. The system of claim 21, wherein the averaged output is compared to the last accepted value, and when the difference of a new measured value is outside a certain time window as compared to the last accepted value, the new measured value will be accepted as a new value.

23. The system of claim 20, wherein the output from the period measurement module is fed to a buffer so that multiple button presses may be read even if there is some latency between receiving multiple tones and the system reading the values of these measurements.

24. The system of claim 19, wherein the period of the control tone is selected so as to be substantially inaudible to a human user.

25. The system of claim 19, wherein the period of the calibration sequence is selected so as to be substantially inaudible to a human user.

26. The system of claim 19, wherein the electronic device compensates for errors in the control tone by taking the ration of the measured periods of the calibration sequence and the control tone to determine the input.

27. A system for controlling an electronic device, the system comprising:
an accessory coupled to the electronic device, the accessory having a user control interlace for receiving at least one input, and a tone generator;
the accessory configured to, in response to an input, generate a corresponding control tone using the tone generator, and send the control tone and a calibration sequence to the electronic device;
the electronic device operable to receive the calibration sequence and control tone, and including a zero-crossing detector operable to determine at least one of the start or ending of each of the calibration sequence and the control tone and having a circuit operable to determine the periods of the calibration sequence and the control tone based on the zero-crossing detector output;
the electronic device further operable to compensate for errors in the control tone based on the periods of the calibration sequence and the control tone to determine the input, and then execute an appropriate action based on the input; and,
a division circuit implemented in at least one of hardware or software, the division circuit based on the measured period values in order to automatically correct for the ratio between two measured periods.

28. The system of claim 27, wherein the period of the control tone is selected so as to be substantially inaudible to a human user.

29. The system of claim 27, wherein the period of the calibration sequence is selected so as to be substantially inaudible to a human user.

* * * * *